(12) United States Patent
Hofmeister (10) Patent No.: US 9,502,952 B2
(45) Date of Patent: Nov. 22, 2016

(54) HYBRID MOTOR

(71) Applicant: Persimmon Technologies, Corp., Wakefield, MA (US)

(72) Inventor: Christopher Hofmeister, Hampstead, NH (US)

(73) Assignee: Persimmon Technologies, Corp., Wakefield, MA (US)

(*) Notice: Subject to any disclaimer, the term of this patent is extended or adjusted under 35 U.S.C. 154(b) by 661 days.

(21) Appl. No.: 13/793,250

(22) Filed: Mar. 11, 2013

(65) Prior Publication Data

US 2014/0103752 A1    Apr. 17, 2014

Related U.S. Application Data

(60) Provisional application No. 61/712,931, filed on Oct. 12, 2012.

(51) Int. Cl.
| | |
|---|---|
| *H02K 21/38* | (2006.01) |
| *H02K 21/44* | (2006.01) |
| *H02K 37/20* | (2006.01) |

(52) U.S. Cl.
CPC .............. *H02K 21/38* (2013.01); *H02K 21/44* (2013.01); *H02K 37/20* (2013.01)

(58) Field of Classification Search
CPC ........ H02K 21/38; H02K 21/44; H02K 37/20
See application file for complete search history.

(56) References Cited

U.S. PATENT DOCUMENTS

| | | | | |
|---|---|---|---|---|
| 3,604,965 | A | * | 9/1971 | Stroud ................... H02K 21/44 310/155 |
| 4,441,043 | A | | 4/1984 | DeCesare ....................... 310/46 |
| 5,348,800 | A | | 9/1994 | Moro et al. .................... 428/328 |
| 5,719,452 | A | * | 2/1998 | Sugiura .................. H02K 37/20 310/268 |
| 5,723,921 | A | * | 3/1998 | Sugiura .................. H02K 37/20 310/49.19 |
| 5,755,986 | A | | 5/1998 | Yamamoto et al. ........ 252/62.54 |
| 5,834,865 | A | | 11/1998 | Suguira .......................... 310/49 |
| 5,936,325 | A | | 8/1999 | Permuy ......................... 310/162 |
| 5,952,756 | A | | 9/1999 | Hsu et al. ..................... 310/156 |
| 6,246,561 | B1 | | 6/2001 | Flynn ............................ 361/147 |
| 6,363,808 | B1 | | 4/2002 | Wakabayashi et al. ... 74/490.03 |
| 6,661,151 | B2 | | 12/2003 | Tan et al. ...................... 310/263 |
| 6,700,271 | B2 | | 3/2004 | Detela ........................... 310/164 |
| 6,750,588 | B1 | | 6/2004 | Gabrys ......................... 310/268 |
| 6,762,525 | B1 | | 7/2004 | Maslov et al. ............... 310/112 |
| 6,770,267 | B2 | | 8/2004 | Daluge et al. ................. 424/54 |
| 6,882,066 | B2 | | 4/2005 | Kastinger ....................... 310/49 |
| 6,891,306 | B1 | | 5/2005 | Soghomonian et al. ..... 310/218 |
| 6,946,771 | B2 | | 9/2005 | Cros et al. .................... 310/257 |
| 7,155,804 | B2 | | 1/2007 | Calico ............................ 29/596 |
| 7,205,697 | B2 | | 4/2007 | Rhyu et al. ................... 310/257 |
| 7,800,276 | B2 | * | 9/2010 | Purvines .............. H02K 1/2733 310/101 |
| 7,830,057 | B2 | | 11/2010 | Gieras ...................... 310/156.02 |

(Continued)

*Primary Examiner* — Dang Le
(74) *Attorney, Agent, or Firm* — Harrington & Smith (57) ABSTRACT

A multi-phase motor including a rotor and a stator including at least one core. The stator includes a plurality of phase sections. Each phase section is configured to provide a phase of the multi-phase motor. Each phase section includes at least one of the core(s), at least two ring magnets having polarity facing in a substantially same direction, and a winding between the at least two ring magnets. The winding is configured to be energized to direct flux through the at least one core at a first portion associated with a first one of the ring magnets, and to be differently energized to direct flux through the at least one core at a second portion associated with a second one of the ring magnets.

20 Claims, 6 Drawing Sheets

(56) References Cited

U.S. PATENT DOCUMENTS

| | | | |
|---|---|---|---|
| 7,898,135 B2 | 3/2011 | Flynn | 310/152 |
| 7,952,252 B2 | 5/2011 | Kang et al. | 310/216.015 |
| 8,283,813 B2 * | 10/2012 | Gilchrist | H02K 7/09 310/114 |
| 8,648,514 B2 * | 2/2014 | Arita | H02K 9/06 310/112 |
| 2009/0001831 A1 | 1/2009 | Cho et al. | 310/112 |
| 2011/0089775 A1 | 4/2011 | Flynn | 310/46 |
| 2011/0129685 A2 | 6/2011 | Skarman et al. | 428/548 |
| 2011/0254389 A1 | 10/2011 | Flynn | 310/46 |
| 2013/0004359 A1 | 1/2013 | Hosek | 419/29 |

* cited by examiner

HYBRID MOTOR

CROSS REFERENCE TO RELATED APPLICATION

This application claims priority under 35 USC 119(e) on U.S. Provisional patent application No. 61/712,931 filed Oct. 12, 2012 which is hereby incorporated by reference in its entirety.

BACKGROUND

1. Technical Field

The exemplary and non-limiting embodiments relate generally to a motor and, more particularly, to a multi-phase motor.

2. Brief Description of Prior Developments

U.S. Pat. No. 6,246,561, which is hereby incorporated by reference in its entirety, discloses controlling a path of magnetic flux from a permanent magnet.

SUMMARY

The following summary is merely intended to be exemplary. The summary is not intended to limit the scope of the claims.

In accordance with one aspect, an example embodiment comprises a multi-phase motor including a rotor and a stator including at least one core. The stator includes a plurality of phase sections. Each phase section is configured to provide a phase of the multi-phase motor. Each phase section includes at least one of the core(s), at least two ring magnets having polarity facing in a substantially same direction, and a winding between the at least two ring magnets. The winding is configured to be energized to direct flux through the at least one core at a first portion associated with a first one of the ring magnets, and to be differently energized to direct flux through the at least one core at a second portion associated with a second one of the ring magnets.

In accordance with another aspect, an example method of assembly comprises locating a winding between two ring magnets to form an assembly, where the ring magnets have polarity facing in a substantially same direction; locating a plurality of the winding and ring magnet assembly in at least one core to form a motor stator; and locating the motor stator around a rotor.

In accordance with another aspect, an example embodiment comprises a substrate transport apparatus comprising a substrate transport arm; and a drive connected to the substrate transport arm. The drive comprises a multi-phase motor. The motor comprises a rotor and a stator. The stator comprises phase sections each including a core, two ring permanent magnets having polarity facing in a substantially same direction, and a winding between the two magnets. The winding is configured to be energized to direct flux through a first portion of the core associated with a first one of the magnets and to be differently energized to direct flux through a second portion of the core associated with a second one of the magnets.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
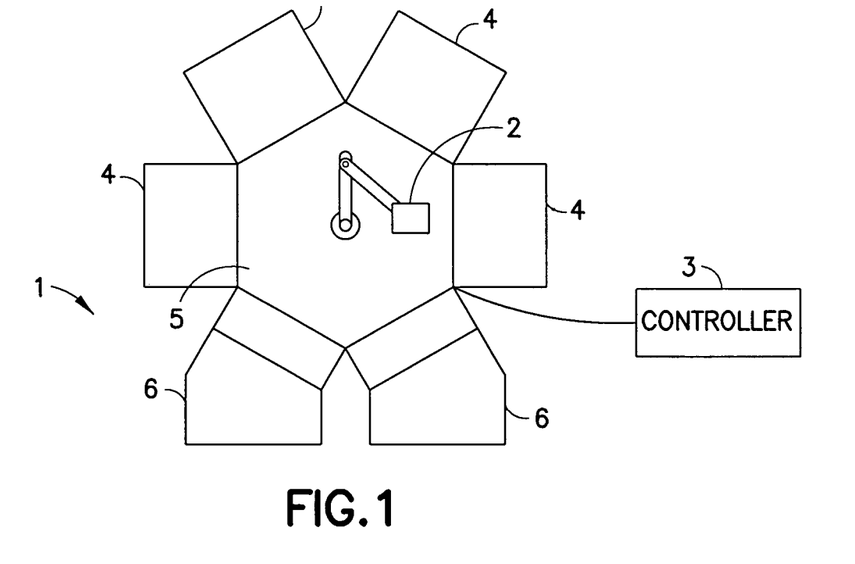
FIG. 1 is a diagram illustrating an example apparatus.

Referring to FIG. 1, there is shown a schematic top plan view of an example substrate processing apparatus 1 having a substrate transport apparatus or robot system 2. Although the present invention will be described with reference to the embodiments shown in the drawings, it should be understood that the present invention may be embodied in many forms of alternative embodiments. In addition, any suitable size, shape or type of materials or elements could be used.

In addition to the substrate transport apparatus 2, in this example embodiment the substrate processing apparatus 1 includes multiple substrate processing chambers 4 and substrate cassette elevators 6 connected to a vacuum chamber 5. The transport apparatus 10 is located, at least partially, in the chamber 5 and is adapted to transport planar substrates, such as semiconductor wafers or flat panel displays, between and/or among the chambers 4 and elevators 6. In alternate embodiments, the transport apparatus 2 could be used in any suitable type of substrate processing apparatus. A controller 3 may be connected to the transport apparatus 2 and chambers 4, 6 to control the various devices.

A conventional vacuum environment robotic manipulator typically includes a drive unit which houses all active components of the robotic manipulator, e.g., actuators and sensors, and one or more arms driven by the drive unit. The arm(s) are typically passive mechanisms, i.e., they do not include any active components, such as actuators and sensors. This is primarily due to difficulties with out-gassing, power distribution and heat removal in vacuum environments.

In a conventional vacuum environment robotic manipulator, since the arm(s) of the robotic manipulators are passive mechanisms, the number of independently driven links is limited to the number of motion axes provided by the drive unit and further constrained by the complexity of transmission of the actuation torques to the individual links of the arm(s). This may limit the arm configurations used in practice, which in turn may limit the reach and throughput performance of the existing vacuum environment robotic manipulators.

Figure 2:
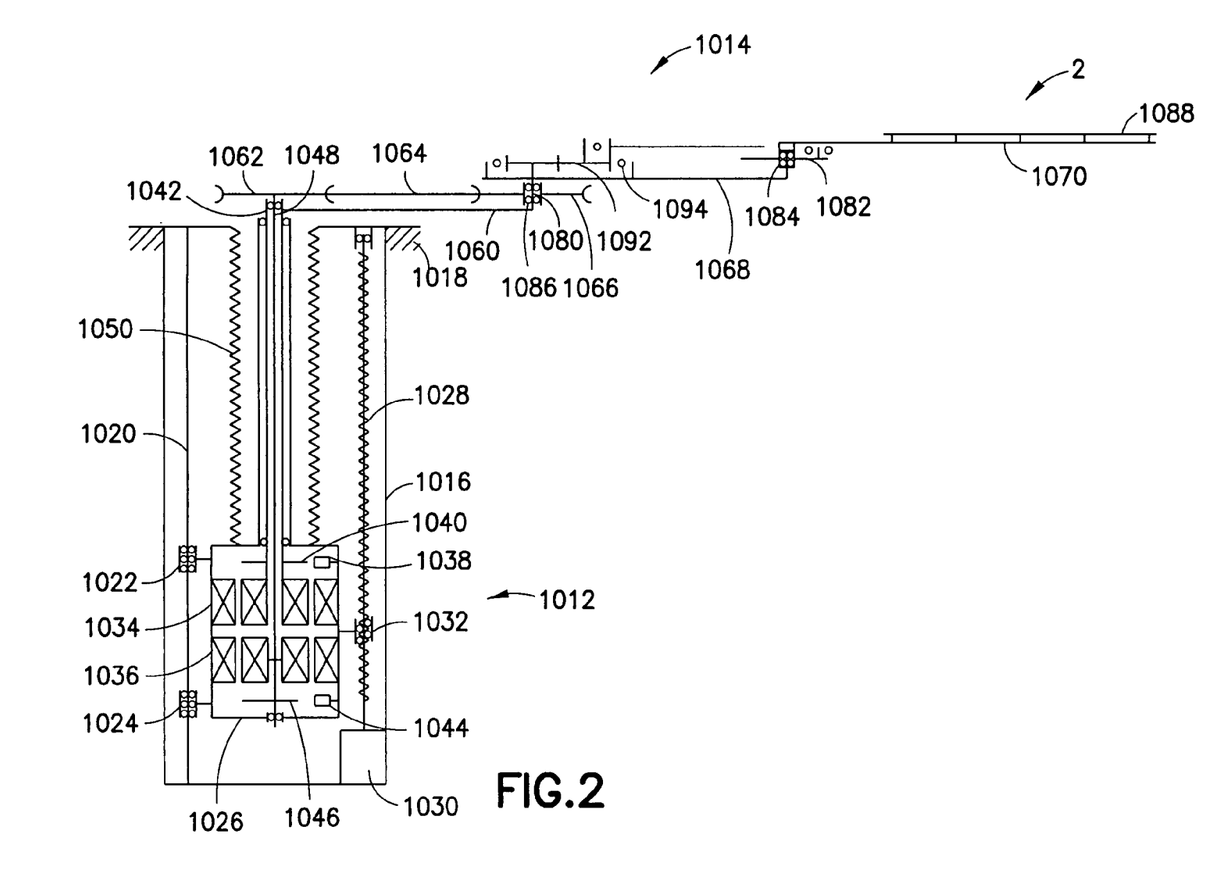
FIG. 2 is a schematic sectional diagram illustrating a robot system of the example apparatus shown in FIG. 1.

Referring also to FIG. 2, in this example embodiment the robot system or substrate transport apparatus 2 includes a drive unit 1012 and a substrate transport arm 1014. The drive unit 1012 may enable a plurality of rotary motion axes and vertical lift motion axes and one or more arm assemblies, e.g., arm assembly 1014 driven by the drive unit 1012. Drive unit chassis 1016 may be suspended from mounting arrangement 1018. The arrangement 1018 may be a chamber, such as the vacuum chamber 5. Alternatively, the mounting arrangement may be on the side, at the bottom, or the drive unit may be mounted in any other suitable manner. Drive unit 1012 may include one or more vertical rails 1020 with linear bearings 1022, 1024 to provide guidance to movable housing 1026 vertically driven by screw 1028 rotated by motor 1030. Ball assembly 1032 is fixed to housing 1026 and is driven by screw 1028. In this example, only one guide rail 1020 is shown for simplicity. Motor 1030, screw 1028, and ball assembly 1032 may form the Z-axis drive for housing 1026.

Housing 1026, itself, may incorporate two rotary motion axes. The first rotary motion axis of housing 1026 may comprise a motor, 1034 (e.g., a stator/rotor pair), and a position encoder, including, for example, encoder read-head 1038 and encoder disk 1040 for shaft 1042. The second rotary motion axis incorporated into the housing may include another motor 1036 and a position encoder, comprising, for example, encoder read-head 1044 and encoder disk 1046 for shaft 1048.

Housing 1026 of the drive unit 1012 may have an internal motor configuration (rotors internal to stators) and a radial position encoder configuration (encoder read-heads arranged radially with respect to encoder disks). Although motors and one arm are shown, more may be provided. In alternate aspects, the various motor and encoder arrangements used in housing 1026 may employ external motor configurations (see for example U.S. Pat. No. 6,363,808 which is hereby incorporated by reference in its entirety). In addition, as a feature of one or more embodiments of the robot system with independent arms, the motors in each housing, whether configured in an internal or external arrangement, may be located coaxially or in a parallel configuration in the same plane (as opposed to being stacked). The stators may be located in vacuum, and a separation wall between the stators and rotors may be used, magnetic couplers or feed through(s) may be employed or another sealing arrangement may be used.

In the example shown, two rotary motion axes, one vertical lift axes, and one arm is shown. However, in other examples, any number of rotary motion axes, vertical lift axes, and arms may be used.

In one aspect, bellows 1050 may be used to accommodate motion of housing 1026 along rail(s) 1020 separating the environment where motor rotors and encoder disks operate, for example, in a vacuum from the outside environment, e.g., the atmosphere. Although the drive unit 1012 has been described in detail above, it should be understood that features as described herein may be used with any suitable drive.

Motor 1034 may drive hollow shaft 1042 which may be connected to first link 1060 of arm assembly 1014. Similarly, motor 1036 may be connected to coaxial inner shaft 1048 which may be coupled (via a belt drive comprising, for example, pulley 1062, belt 1064 and pulley 1066) to second link 1068. Alternately, motor 36 and encoder 1044, 1046 may be packaged in the first link 1060 directly or indirectly driving the second link 1068.

In this example embodiment the substrate transport arm has an end-effector 1070 at an end of the second link 1068. A shaft 1080 incorporated into the first link 1060, and the wrist 1082 are connected to the end-effector 1070, where the wrist 1082 is rotatable on second link 1068 by a bearing 1084 coupling the wrist 1082 to the second link 1068. The first link 1060 and the second link 1068 may be coupled via bearings or rotary joint 1086. The second link 1068 and the end-effector 1070 may be coupled through rotary joint 1084. The end-effector 1070 may carry payload 1088, for example, a semiconductor substrate or other suitable substrate or payload. The description of the substrate transport arm 1014 is merely an example. Features as described herein may be used with other types of substrate transport arms, and other types of robots.

Figure 3:
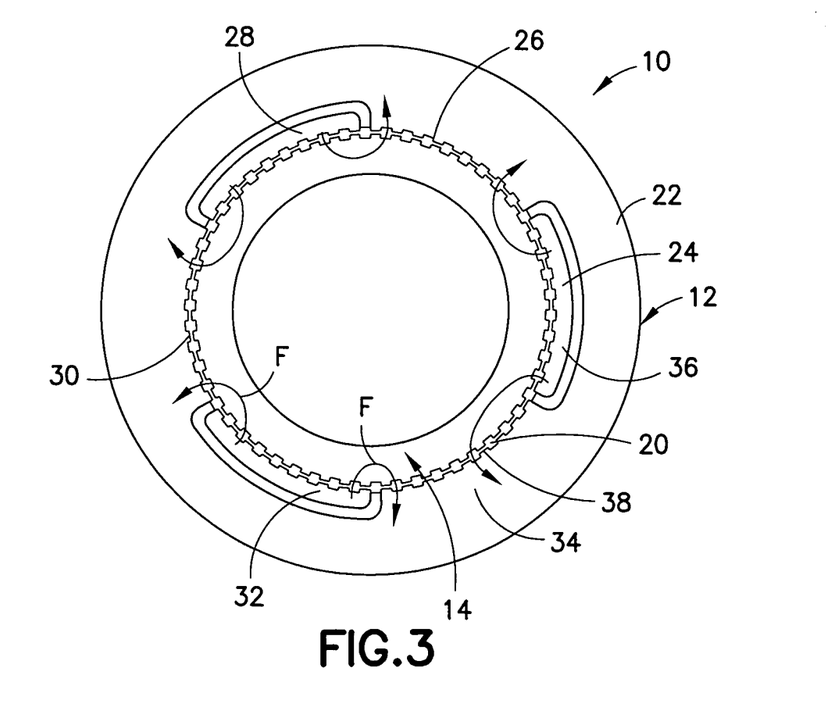
FIG. 3 shows an embodiment of a hybrid motor of the apparatus shown in FIGS. 1-2.

Features as described herein generally relate to a hybrid motor and, more particularly, to a hybrid motor having ring magnets. Referring also to FIG. 3, there is shown a schematic plan view of an example hybrid motor 10. The motor 10 may be one or both of the motors 1034, 1036 for example. Although features will be described with reference to the embodiments shown in the drawings, it should be understood that the present invention may be embodied in many forms of alternative embodiments. In addition, any suitable size, shape or type of materials or elements could be used.

In FIG. 3, the hybrid motor 10 is shown having a stator 12 and a rotor 14. The rotor 14 is shown having teeth 20. The rotor 14 may be configured as a rotor of material, solid or otherwise, that may be a highly permeable material suitable for use in electric motors. Such material may be laminated, solid or formed of a soft magnetic composite (SMC) material or by any suitable method. By way of example, a suitable SMC material may be as described in US 2013/0004359 which is hereby incorporated by reference in its entirety. In alternate aspects, any suitable soft magnetic material or suitable material may be provided. In alternate aspects, more or less teeth may be provided or no teeth may be provided. As will be described, in this example embodiment the stator 12 has a solid core, for example stator cores 22 and 24 as will be described. Further, the stator 12 may have two or more ring magnets substantially disposed within the cores. Examples are described in alternate example configurations below. Further, the stator 12 may have one or more windings substantially disposed within the cores. Examples are described in alternate configurations below. In the embodiment shown, the stator 12 is shown having alternating claw poles 26-36, each having teeth 38. Thus, in this example the motor is a claw pole motor. In alternate aspects, more or less teeth may be provided or no teeth may be provided. Although six claw poles are shown, more or less than six claw poles may be provided.

Depending upon the direction of current in the winding, magnetic flux is selectively directed from one claw pole, through the rotor, and to an adjacent claw pole. Further, depending upon the direction of current in the winding, magnetic flux is selectively directed from different sides of a given stator (where the teeth may be phased with respect to an adjacent side) through the rotor and to the different sides as will be described.

The stator 12 may have multiple stator portions having different respective phases interacting with rotor 14 as will be shown by way of the examples below. In this example embodiment, two or more stator portions with windings may be stacked and phased to interact with the rotor 14. In alternate aspects, multiple windings, for example, two or more, may be segmented within a single stator (as will be described with respect to FIG. 4 by way of example). Further, in alternate aspects, instead of claw poles, stacked (axially, radially or otherwise) stator solid rotor portions may interact with rotor 14, for example, two or more, as will be described with respect to FIG. 4 by way of example. Accordingly, all such combinations may be provided either alone or in combination.

Figure 4:
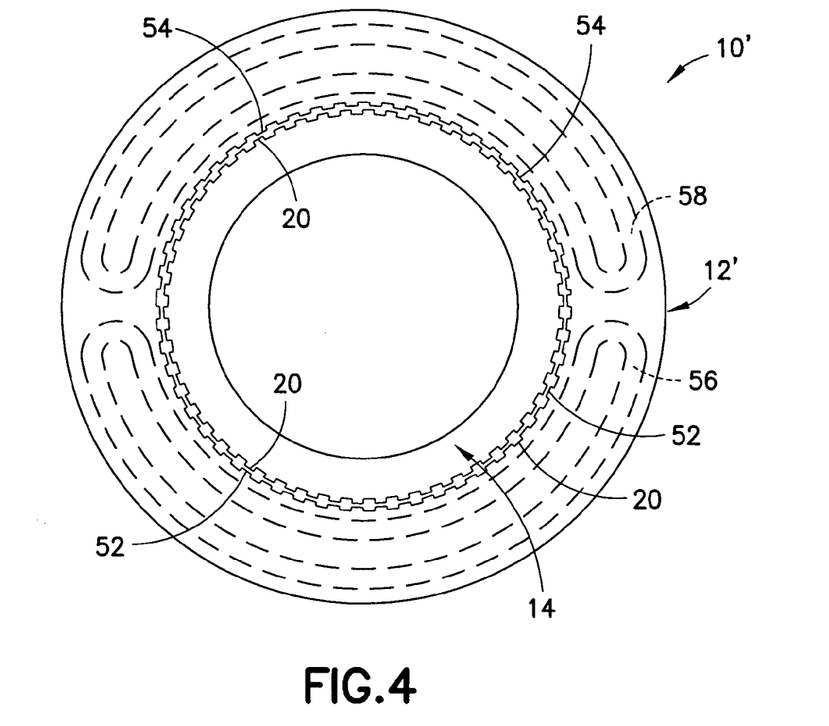
FIG. 4 shows an alternate aspect embodiment of a hybrid motor.

In FIG. 4, hybrid motor 10' is shown having stator 12' and rotor 14. Rotor 14 is shown having teeth 20 and may be configured as a rotor such as shown in FIG. 3. As will be described, stator 12' has a solid core of one or more components, stacked or otherwise. Further, stator 12' may have two or more ring magnets substantially disposed within the cores as will be described in alternate configurations. Further, stator 12' may have one or more windings substantially disposed within the cores as will be described in alternate configurations. In the embodiment shown, stator 12' is shown having two sets of teeth 52, 54 corresponding to embedded windings 56, 58 respectively. In alternate aspects, more or less teeth may be provided or no teeth may be provided. Although two windings are shown, more or less windings may be provided. In this example the two sets of teeth 52, 54 are 90 degrees different (compare the alignment of the teeth 52 relative to the rotor teeth 20 at the bottom of the figure versus the alignment of the teeth 54 relative to the rotor teeth 20 at the top of the figure. Thus, the motor may have a single stack of the two windings 56, 58 at the stator, and provide a 2-phase device. Thus, two stacks of windings, such as shown in FIGS. 5-6 for example, are not necessary.

Depending upon the direction of current in the winding 56, 58, magnetic flux may be selectively directed from different sides of a given stator (where the teeth may be phased with respect to an adjacent side) and selectively directed from different segments of a given stator (corresponding to windings 56, 58 and respectively phased teeth 52, 54) through the rotor and to the different sides and segments. Although two segments are shown, more or less may be provided. Stator 12' may have multiple stator portions having different respective phases interacting with rotor 14' as will be shown by way of example. In this example embodiment, two or more stator portions with windings may be stacked and phased to interact with rotor 14' and/or multiple windings, for example, two or more, may be segmented within a single stator. Further, in alternate aspects, combinations of axially, radially or otherwise stator solid rotor portions may interact with rotor 14, for example, two or more. Accordingly, all such combinations may be provided either alone or in combination.

Figure 5:
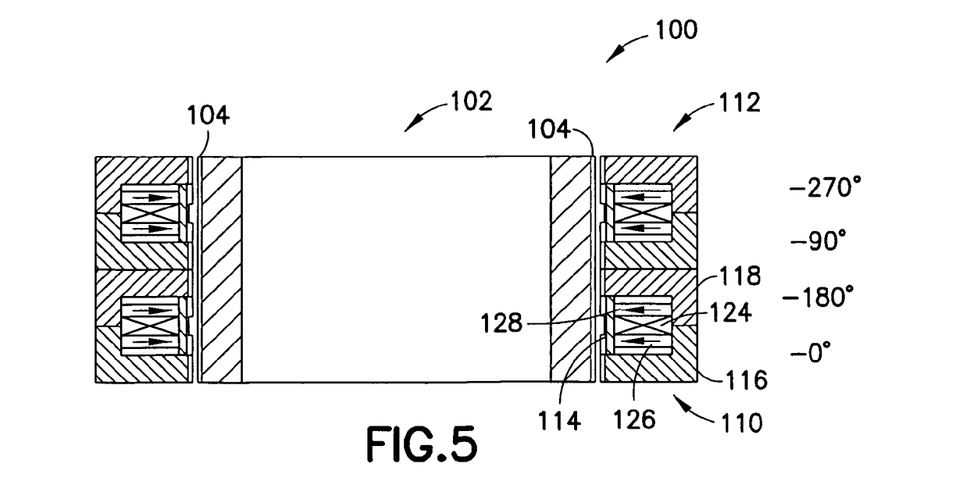
FIG. 5 shows a cross section of a hybrid motor.
Figure 6:
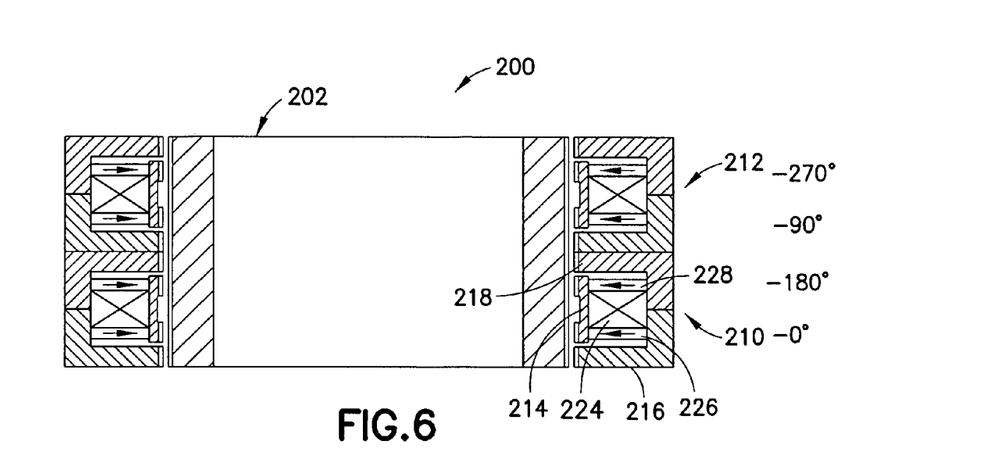
FIG. 6 shows a cross section of a hybrid motor.

In FIG. 5, an exemplary hybrid claw pole stepping motor 100 is shown. Although a two phase example is shown, alternately any suitable number of phases (such as three or more) may be provided. Solid rotor 102 has equally spaced teeth that direct between stator members 110, 112. In this example embodiment, stator members 110, 112 may be similar and phased with respect to each other as shown. Stator member 110 has inner toothed member 114 and outer toothed members 116, 118. In this example embodiment, outer toothed members 116, 118 may be phased 0 and 180 degrees with respect to the teeth on rotor 102 and where inner member 114 has two sets of teeth similarly phased to correspond to those on outer members 116, 118. Similarly stator member 112 has teeth phased at 90 and 270 degrees respectively. Stator member 110 further has winding 124 that may be wound similar to a bobbin with radially magnetized ring permanent magnets 126, 128.

Depending upon the magnitude and direction of current in winding 124, flux is selectively directed in the direction of stator portion 116 and 118, and through the teeth on rotor 102, and back through the teeth on inner portion 114 of stator 110 similar to the Flux arrows F shown in FIG. 3 for a claw pole motor. In this example embodiment, flux may selectively be directed between teeth on two inner stator members and teeth on the four outer stator members. In this example embodiment, the outer stator members may be substantially identical (and may be separate or integrally formed) with claw poles while the inner stator members have two interleaved and opposing sets of claw poles having teeth 180 degrees out of phase as shown. In this example embodiment, each outer stator member may be phased 90 and 180 degrees with respect to the others as shown where a simple coil winding is provided for each stator set as shown and having two ring magnets that direct flux in the same direction. Energizing each winding either positively or negatively selectively directs flux to one or the other outer stator for each of the two phases.

Alternately, two or more segments may be provided, for example as seen in FIG. 4 with additional ring magnets to selectively direct flux through rotor 102. Alternately, any suitable combination may be provided. In alternate aspects, more or less teeth or no teeth may be provided, additional or less claw poles, two sided solid rotor or other modifications such as further overlapping tooth structure or otherwise may be provided. Further, two or three phases may be placed in a single stack with 180 degree or 120 degree winding sets respectively. Claw poles need not be used in the event of offset poles. A combination of radial or axial flux paths may be provided. Accordingly, all such combinations may be provided.

In FIG. 6, an exemplary hybrid motor 200 is shown. Although a two phase example is shown, alternately any suitable number of phases (such as three or more) may be provided. In this example, the teeth of the stator and the rotor are similar to that shown with the teeth 20, 52, 54 in FIG. 4. Solid rotor 202 has equally spaced teeth that direct between stator members 210, 212. In this example embodiment, stator members 210, 212 may be similar and phased with respect to each other as shown. Stator member 210 has inner toothed member 214 and outer toothed members 216, 218. In this example embodiment, outer toothed members 216, 218 may be phased 0 and 180 degrees with respect to the teeth on rotor 202 and where inner member 214 has two sets of teeth similarly phased to correspond to those on outer members 216, 218. Similarly stator member 212 has teeth phased at 90 and 270 degrees respectively. Stator member 210 further has winding 224 that may be wound similar to a bobbin with radially magnetized ring permanent magnets 226, 228.

Depending upon the magnitude and direction of current in winding 224, flux is selectively directed in the direction of either of stator portion 216 and 218 and through the teeth on rotor 202 and back through the teeth on inner portion 214 of stator 210. In this example embodiment, flux may selectively be directed between teeth on two inner stator members and teeth on four outer stator members. In this example embodiment, the outer stator members may be substantially identical (and may be separate or integrally formed) having teeth 180 degrees out of phase as shown. In this example embodiment, each outer stator member may be phased 90 and 180 degrees with respect to the others as shown where a simple coil winding is provided for each stator set as shown and having two ring magnets that direct flux in the same direction. This is illustrated in FIGS. 6A and 6B for example.

Figure 6A:
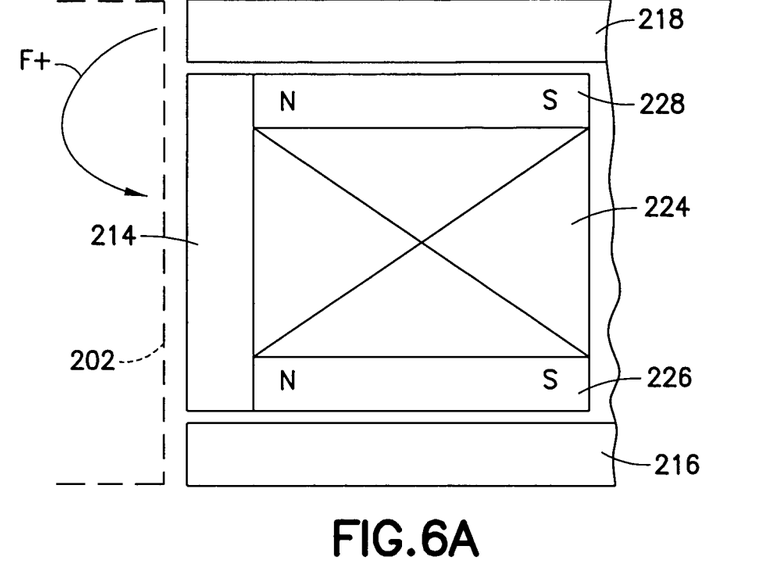
FIGS. 6A and 6B show examples of flow of flux dependent upon direction of electricity in the winding.
Figure 6B:
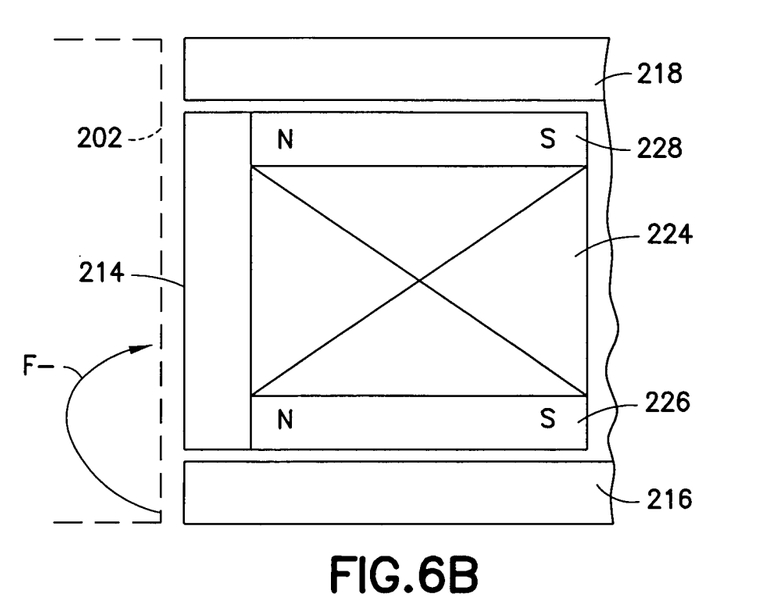

As illustrated in FIG. 6A, when the coil or winding 224 is energized in a first direction, flux F+ flows in the direction of the top stator portion 218, through the teeth on rotor 202, and back through the teeth on inner portion 214. As illustrated in FIG. 6B, when the coil or winding 224 is energized in a second different direction, flux F− flows in the direction of the bottom stator portion 216, through the teeth on rotor 202, and back through the teeth on inner portion 214. In one type of alternate example embodiment, the teeth of the rotor and/or stator could comprise a combination of different types of teeth, such as the axially longer height claw pole teeth shown in FIG. 3, and the axially shorter height teeth shown in FIG. 4.

Energizing each winding either positively or negatively selectively directs flux to one or the other outer stator for each of the two phases. Alternately, two or more segments may be provided, for example as seen in FIG. 4 with additional ring magnets and/or windings to selectively direct flux through rotor 202. Alternately, any suitable combination may be provided. In alternate aspects, more or less teeth or no teeth may be provided, with claw poles, two sided solid rotor or other modifications such as overlapping tooth structure or otherwise may be provided. Further, two or three phases may be placed in a single stack with 180 degree or 120 degree winding sets respectively. Claw poles need not be used in the event of offset poles as seen. A combination of radial or axial flux paths may be provided. Although the permanent magnets are shown with radial flux in the same direction, opposite directions for all or a subset of the magnets may be provided. Accordingly, all such combinations may be provided with respect to any of the disclosed embodiments.

Figure 7:
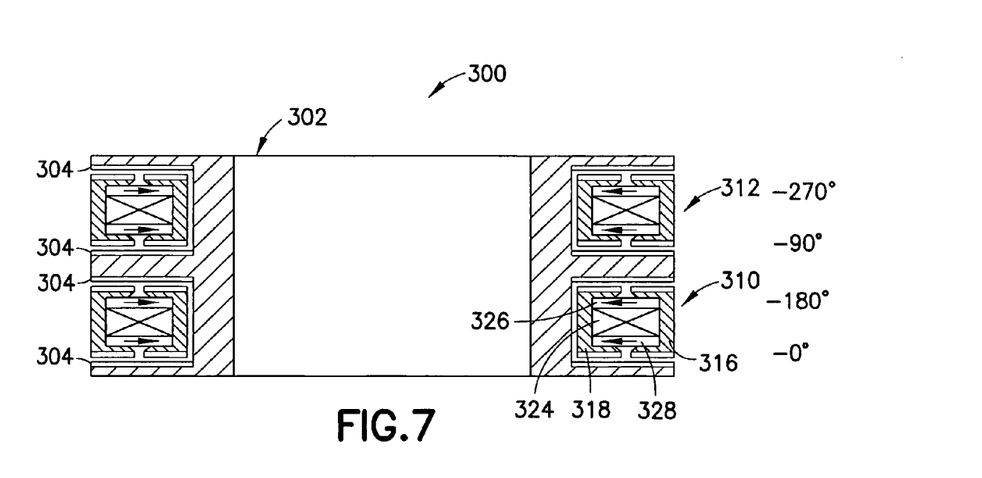
FIG. 7 shows a cross section of a hybrid motor.

In FIG. 7, an exemplary axial flux hybrid motor 300 is shown. Although a two phase example is shown, alternately any suitable number of phases (such as three or more) may be provided. Solid rotor 302 has axially opposing equally spaced teeth 304 that direct flux between opposing axial sides of stator members 310, 312. In this example embodiment, stator members 310, 312 may be similar and phased with respect to each other as shown (either by relative position of the stators teeth or by relative position of the rotors teeth 304 or a combination of the two). Stator member 310 has toothed members 316, 318. In this example embodiment, axially opposing sides of toothed members 316, 318 may be phased 0 and 180 degrees with respect to the teeth on rotor 302 (or opposing teeth 304 on rotor may instead be so phased). Similarly stator member 312 may have teeth phased at 90 and 270 degrees respectively. Stator member 310 further has winding 324 that may be wound similar to a bobbin with radially magnetized ring permanent magnets 326, 328.

Depending upon the magnitude and direction of current in winding 324, flux is selectively directed in the direction of either of magnets 326, 328 and through the teeth on rotor 302 and linked with stator portions 316, 318. In this example embodiment, flux may selectively be directed to opposing teeth on the four stator members. Energizing each winding either positively or negatively selectively directs flux to one opposing side of the stator members for each of the two phases. Alternately, two or more segments may be provided, for example as seen in FIG. 2 with additional ring magnets and/or windings to selectively direct flux through rotor 302. Alternately, any suitable combination may be provided. In alternate aspects, more or less teeth or no teeth may be provided, with claw poles, two sided solid rotor or other modifications such as overlapping tooth structure or otherwise may be provided. Further, two or three phases may be placed in a single stack with 180 degree or 120 degree winding sets respectively. Claw poles need not be used in the event of offset poles as seen. A combination of radial or axial flux paths may be provided. Although the permanent magnets are shown with radial flux in the same direction, opposite directions for all or a subset of the magnets may be provided. Accordingly, all such combinations may be provided with respect to any of the disclosed embodiments.

Figure 8:
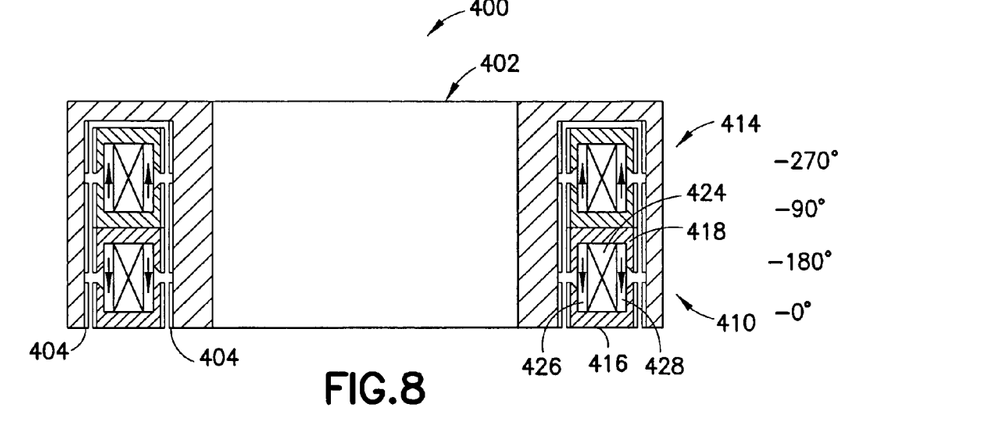
FIG. 8 shows a cross section of a hybrid motor.

In FIG. 8, an exemplary radial flux hybrid motor 400 is shown. Although a two phase example is shown, alternately any suitable number of phases (such as three or more for example) may be provided. Solid rotor 402 has radially opposing equally spaced teeth 404 that direct flux between opposing radial sides of stator members 410, 412. In this example embodiment, stator members 410, 412 may be similar and phased with respect to each other as shown (either by relative position of the stators teeth or by relative position of the rotors teeth 404 or a combination of the two). Alternately, and with respect to the disclosed embodiments, any suitable combination of phasing may be used. Stator member 410 has toothed members 416, 418. In this example embodiment, radially opposing sides of toothed members 416, 418 may be phased 0 and 180 degrees with respect to the teeth on rotor 402 (or opposing teeth 404 on rotor may instead be so phased). Similarly stator member 412 may have teeth phased at 90 and 270 degrees respectively. Stator member 410 further has winding 424 that may be wound similar to a bobbin with axially magnetized ring permanent magnets 426, 428. Alternately, windings may be segmented and teeth phased, for example, similar to that of FIG. 2 (or in FIG. 9 with the coil orientation rotated 90 degrees) where each side of the view shown in FIG. 8 has a single winding wound such that the two middle stator components form a core and the upper and lower stator components are separate.

Depending upon the magnitude and direction of current in winding 424, flux is selectively radially directed in the direction of either of magnets 426, 428 and through the teeth on rotor 402 and linked with stator portions 416, 418. In this example embodiment, flux may selectively be directed to opposing teeth on the four stator members. Energizing each winding either positively or negatively selectively directs flux to one opposing side of the stator members for each of the two phases. Alternately, two or more segments may be provided, for example as seen in FIG. 4 with additional ring magnets and/or windings to selectively direct flux through rotor 402. Alternately, any suitable combination may be provided. In alternate aspects, more or less teeth or no teeth may be provided, with claw poles, two sided solid rotor or other modifications such as overlapping tooth structure or otherwise may be provided. Further, two or three phases may be placed in a single stack with 180 degree or 120 degree winding sets respectively. Claw poles need not be used in the event of offset poles as seen. A combination of radial or axial flux paths may be provided. Although the permanent magnets are shown with axial flux in the same direction, opposite directions for all or a subset of the magnets may be provided. Accordingly, all such combinations may be provided with respect to any of the disclosed embodiments.

Figure 9:
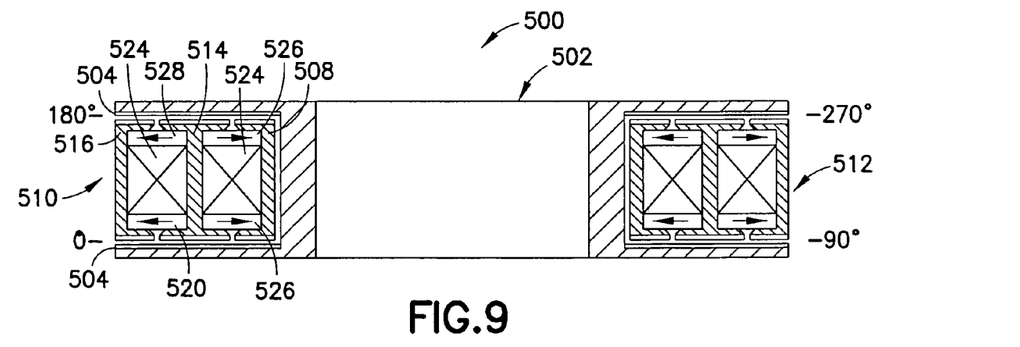
FIG. 9 shows a cross section of a hybrid motor.

In FIG. 9, an exemplary axial flux hybrid motor 500 is shown. Although a two phase example is shown, alternately any suitable number of phases 3, 4 or otherwise may be provided. Solid rotor 502 has equally spaced axially opposing teeth 504 that direct flux between stator members 510, 512. In this example embodiment, stator members 510, 512 may be similar and phased with respect to each other as shown. Stator member 510 has inner toothed member 514 and outer toothed members 516, 518 where outer toothed members 516, 518 are radially surrounding member 514 as shown. In this example embodiment, axially opposing sides of outer toothed members 516, 518 may be phased 0 and 180 degrees with respect to the teeth on rotor 502 and where inner member 514 has two sets of axially opposing teeth similarly phased to correspond to those on axially opposing sides of outer members 516, 518. Similarly stator member 512 has teeth phased at 90 and 270 degrees respectively. Stator member 510 further has winding 524 that may be wound similar as seen in FIG. 4 with radially magnetized ring permanent magnets 526, 528.

Depending upon the magnitude and direction of current in winding 524, flux is selectively directed axially to one axial side or the other axial side with respect to stator portions 516 and 518 and through the teeth on rotor 502 and back through the teeth on inner portion 514 of stator 510. In this example embodiment, flux may selectively be directed between teeth on two inner stator members and teeth on four outer stator members of stators 510, 512. Alternately, two or more segments may be provided with additional ring magnets and/or windings to selectively direct flux through rotor 502. Alternately, any suitable combination may be provided. In alternate aspects, more or less teeth or no teeth may be provided, with claw poles, two sided solid rotor or other modifications such as overlapping tooth structure or otherwise may be provided. Further, two or three phases may be placed in a single stack with 180 degree or 120 degree winding sets respectively. Claw poles need not be used in the event of offset poles as seen. A combination of radial or axial flux paths may be provided. Although the permanent magnets are shown with radial flux in the same direction, opposite directions for all or a subset of the magnets may be provided. Accordingly, all such combinations may be provided with respect to any of the disclosed embodiments.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the claims.

In one example embodiment a multi-phase motor comprises a rotor; and a stator comprising at least one core, where the stator comprises a plurality of phase sections, where each phase section is configured to provide a phase of the multi-phase motor, where each phase section comprises at least one of the core(s), at least two ring magnets having polarity facing in a substantially same direction, and a winding between the at least two ring magnets, where the winding is configured to be energized to direct flux through the at least one core at a first portion associated with a first one of the ring magnets and to be differently energized to direct flux through the at least one core at a second portion associated with a second one of the ring magnets.

The at least one core may comprise a soft magnetic composite (SMC) material. The stator may comprise first and second stator members, where the each stator member comprises an inner toothed member and two outer toothed members. Teeth of the outer toothed members of the first stator member may be phased zero (0) degrees and 180 degrees relative to teeth on the rotor. Teeth of the outer toothed members of the second stator member may be phased 90 degrees and 270 degrees relative to teeth on the rotor. The inner toothed member of the first stator member may comprise two sets of teeth, where each set of teeth are phased to correspond to one of the phases of the teeth of the outer toothed members of the first stator member. The ring magnets may be permanent radially magnetized ring magnets. A first phase section may comprise inner and outer stator members, where the each stator member comprises a top toothed section and a bottom toothed section. A first phase section may comprise top and bottom stator members, where the each stator member comprises an inner toothed section and an outer toothed section. A first phase section may comprise a first stator member and a second stator member, where a second phase section comprises the second stator member and a third stator member, and where the each stator member comprises a top toothed section and a bottom toothed section.

One type of example method of assembly comprises locating a winding between two ring magnets to form an assembly, where the ring magnets have polarity facing in a substantially same direction; locating a plurality of the winding and ring magnet assembly in at least one core to form a motor stator; and locating the motor stator around a rotor.

The method may further comprise energizing the winding in a first direction to direct flux through the at least one core at a first portion of the at least one core associated with a first one of the ring magnets and energizing the winding in a second opposite direction to direct flux through the at least one core at a second portion of the at least one core associated with a second one of the ring magnets. The method may further comprise providing the at least one core as a soft magnetic composite (SMC) material. Locating the plurality of the winding and ring magnet assembly may comprise forming first and second stator members, where the each stator member comprises an inner toothed member and two outer toothed members. Teeth of the outer toothed members of the first stator member may be provided phased zero (0) degrees and 180 degrees relative no teeth on the rotor. Teeth of the outer toothed members of the second stator member may be provided phased 90 degrees and 270 degrees relative to teeth on the rotor. The inner toothed member of the first stator member may be provided as two sets of teeth, where each set of teeth are phased to correspond to one of the phases of the teeth of the outer toothed members of the first stator member. The ring magnets may be provided as permanent radially magnetized ring magnets. The stator may be provided with a first phase section comprising inner and outer stator members, where the each stator member comprises a top toothed section and a bottom toothed section.

An example embodiment may comprise a substrate transport apparatus comprising a substrate transport arm; and a drive connected to the substrate transport arm, where the drive comprises a multi-phase motor, where the motor comprises a rotor and a stator, where the stator comprises phase sections each including a core, two ring permanent magnets having polarity facing in a substantially same direction, and a winding between the two magnets, where the winding is configured to be energized to direct flux through a first portion of the core associated with a first one of the magnets and to be differently energized to direct flux through a second portion of the core associated with a second one of the magnets.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A multi-phase motor comprising:
   a rotor; and
   a stator comprising at least one core, where the stator comprises a plurality of phase sections, where each phase section is configured to provide a phase of the multi-phase motor, where each phase section comprises at least one of the core(s), at least two ring magnets having polarity facing in a substantially same direction, and a winding between the at least two ring magnets, where the ring magnets comprise permanent radially magnetized ring magnets, where the winding is configured to be energized to direct flux through the at least one core at a first portion associated with a first one of the ring magnets and to be differently energized to direct flux through the at least one core at a second portion associated with a second one of the ring magnets.

2. A multi-phase motor as in claim 1 where the at least one core comprises a soft magnetic composite (SMC) material.

3. A multi-phase motor as in claim 1 where the stator comprises first and second stator members, where the each stator member comprises an inner toothed member and two outer toothed members.

4. A multi-phase motor as in claim 3 where teeth of the outer toothed members of the first stator member are phased zero (0) degrees and 180 degrees relative to teeth on the rotor.

5. A multi-phase motor as in claim 4 where teeth of the outer toothed members of the second stator member are phased 90 degrees and 270 degrees relative to teeth on the rotor.

6. A multi-phase motor as in claim 4 where the inner toothed member of the first stator member comprises two sets of teeth, where each set of teeth are phased to correspond to one of the phases of the teeth of the outer toothed members of the first stator member.

7. A multi-phase motor as in claim 1 where a first phase section comprises inner and outer stator members, where the each stator member comprises a top toothed section and a bottom toothed section.

8. A multi-phase motor as in claim 1 where a first phase section comprises top and bottom stator members, where the each stator member comprises an inner toothed section and an outer toothed section.

9. A substrate transport apparatus comprising:
a substrate transport arm; and
a drive connected to the substrate transport arm, where the drive comprises the multi-phase motor of claim 1.

10. A multi-phase motor comprising:
a rotor; and
a stator comprising at least one core, where the stator comprises a plurality of phase sections, where each phase section is configured to provide a phase of the multi-phase motor, where each phase section comprises at least one of the core(s), at least two ring magnets having polarity facing in a substantially same direction, and a winding between the at least two ring magnets, where the winding is configured to be energized to direct flux through the at least one core at a first portion associated with a first one of the ring magnets and to be differently energized to direct flux through the at least one core at a second portion associated with a second one of the ring magnets,
where a first phase section comprises a first stator member and a second stator member, where a second phase section comprises the second stator member and a third stator member, and where the each stator member comprises a top toothed section and a bottom toothed section.

11. A multi-phase motor as in claim 10 where the at least one core comprises a soft magnetic composite (SMC) material.

12. A multi-phase motor as in claim 10 where the stator comprises first and second stator members, where the each stator member comprises an inner toothed member and two outer toothed members.

13. A multi-phase motor as in claim 10 where teeth of the outer toothed members of the first stator member are phased zero (0) degrees and 180 degrees relative to teeth on the rotor.

14. A multi-phase motor as in claim 13 where teeth of the outer toothed members of the second stator member are phased 90 degrees and 270 degrees relative to teeth on the rotor.

15. A multi-phase motor as in claim 13 where the inner toothed member of the first stator member comprises two sets of teeth, where each set of teeth are phased to correspond to one of the phases of the teeth of the outer toothed members of the first stator member.

16. A multi-phase motor as in claim 10 where the ring magnets are permanent radially magnetized ring magnets.

17. A substrate transport apparatus comprising:
a substrate transport arm; and
a drive connected to the substrate transport arm, where the drive comprises the multi-phase motor of claim 10.

18. A multi-phase motor comprising:
a rotor; and
a stator comprising at least one core, where the stator comprises a plurality of phase sections, where each phase section is configured to provide a phase of the multi-phase motor, where each phase section comprises at least one of the core(s), at least two ring magnets having polarity facing in a substantially same direction, and a winding between the at least two ring magnets, where the winding is configured to be energized to direct flux through the at least one core at a first portion associated with a first one of the ring magnets and to be differently energized to direct flux through the at least one core at a second portion associated with a second one of the ring magnets, where a first phase section comprises spaced top and bottom stator members having the at least two ring magnets and the winding therebetween, where the each stator member comprises an inner toothed section and an outer toothed section facing an opposite direction.

19. A multi-phase motor as in claim 18 where the at least one core comprises a soft magnetic composite (SMC) material.

20. A substrate transport apparatus comprising:
a substrate transport arm; and
a drive connected to the substrate transport arm, where the drive comprises the multi-phase motor of claim 18.

* * * * *